(12) United States Patent
Matori et al.

(10) Patent No.: US 11,255,947 B2
(45) Date of Patent: Feb. 22, 2022

(54) TRANSPORTATION APPARATUS

(71) Applicant: HONDA MOTOR CO., LTD., Tokyo (JP)

(72) Inventors: Tadahiro Matori, Saitama (JP); Takayuki Iizuka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 390 days.

(21) Appl. No.: 16/388,201

(22) Filed: Apr. 18, 2019

(65) Prior Publication Data

US 2019/0324120 A1    Oct. 24, 2019

(30) Foreign Application Priority Data

Apr. 19, 2018  (JP) .............................. JP2018-080644

(51) Int. Cl.
| | |
|---|---|
| *G01S 7/03* | (2006.01) |
| *G01S 7/02* | (2006.01) |
| *B60R 21/01* | (2006.01) |
| *B60R 11/00* | (2006.01) |
| *B60R 19/48* | (2006.01) |

(Continued)

(52) U.S. Cl.
CPC ............... *G01S 7/03* (2013.01); *B60R 19/483* (2013.01); *B60R 2011/008* (2013.01); *B60R 2021/01006* (2013.01); *B60R 2022/401* (2013.01); *G01S 7/027* (2021.05); *G01S 2013/93275* (2020.01)

(58) Field of Classification Search
CPC .. G01S 7/03; G01S 7/027; G01S 2013/93272; G01S 2013/93275; G01S 13/931; G01S 17/931; G01S 2013/93271; G01S 7/497; G01S 2013/93274; G01S 2015/938; G01S 7/40; G01S 7/4813; G01S 7/4972; B60R 19/483; B60R 2011/008; B60R 2021/01006; B60R 2022/401; H01Q 1/3283; H01Q 1/3233
See application file for complete search history.

(56) References Cited

U.S. PATENT DOCUMENTS

| | | | |
|---|---|---|---|
| 7,675,460 B2 * | 3/2010 | Sanada .................. | G01S 7/4026 342/173 |
| 2005/0062641 A1 * | 3/2005 | Kakishita .............. | G01S 7/2813 342/70 |

(Continued)

FOREIGN PATENT DOCUMENTS

| | | |
|---|---|---|
| CN | 2705348 Y | 6/2005 |
| JP | H11-125671 A | 5/1999 |

(Continued)

OTHER PUBLICATIONS

Sep. 7, 2021, Japanese Office Action issued for related JP application No. 2018-080644.

*Primary Examiner* — Olumide Ajibade Akonai
(74) *Attorney, Agent, or Firm* — Paratus Law Group, PLLC

(57) ABSTRACT

A transportation apparatus includes an external detection device configured to detect an object. The external detection device includes: an irradiation surface; and an adjustment portion for adjusting an angle of the irradiation surface, the adjustment portion is adjustable from a hole portion provided in the transportation apparatus, and the hole portion is offset with respect to the adjustment portion and the irradiation surface.

8 Claims, 10 Drawing Sheets

(51) Int. Cl.
*B60R 22/40* (2006.01)
*G01S 13/931* (2020.01)

(56) References Cited

U.S. PATENT DOCUMENTS

| | | | |
|---|---|---|---|
| 2011/0050525 A1* | 3/2011 | Sanada | H01Q 1/3233 343/760 |
| 2014/0299644 A1* | 10/2014 | Aleem | H01Q 1/3233 224/555 |
| 2017/0285165 A1* | 10/2017 | Khlifi | G01S 13/86 |
| 2018/0290612 A1* | 10/2018 | Ikeno | B60R 21/34 |
| 2019/0162845 A1* | 5/2019 | Yasui | G01S 15/931 |
| 2019/0195986 A1* | 6/2019 | Hellinger | H01Q 1/3233 |
| 2019/0248226 A1* | 8/2019 | Shinohara | B60R 21/34 |

FOREIGN PATENT DOCUMENTS

| | | |
|---|---|---|
| JP | 2003-170794 A | 6/2003 |
| JP | 2005-069735 A | 3/2005 |
| JP | 2006-199203 A | 8/2006 |
| JP | 2006-232155 A | 9/2006 |

* cited by examiner

TRANSPORTATION APPARATUS

CROSS-REFERENCE TO RELATED APPLICATIONS

The present application claims the benefit of priority of Japanese Patent Application No. 2018-080644, filed on Apr. 19, 2018, the content of which is incorporated herein by reference.

TECHNICAL FIELD

The present invention relates to a transportation apparatus including an external detection device for detecting an object.

BACKGROUND ART

A transportation apparatus including an external detection device (for example, radar device) for detecting an object at the front has been known. In this type of transportation apparatus, an adjustment portion for adjusting an angle of an irradiation surface is necessary so that the irradiation surface of the external detection device is directed to a predetermined direction. In the transportation apparatus disclosed in JP-A-2003-170794, an adjustment portion for adjusting an angle of an irradiation surface by using an adjustment tool is provided.

However, the adjustment portion disclosed in JP-A-2003-170794 is disposed at a position in a vicinity of a right side or a left side of the irradiation surface and adjusted by an adjustment tool inserted from a vertical direction. Therefore, when an angle of the irradiation surface is adjusted, an operator stands in front of the irradiation surface. As a result, there is a concern that irradiation of the irradiation surface can be hindered.

SUMMARY

The invention provides a transportation apparatus which can reduce a possibility of an operator hindering irradiation when an angle of an irradiation surface of an external detection device is adjusted.

According to an aspect of the invention, there is provided a transportation apparatus including an external detection device configured to detect an object, in which:
the external detection device includes:
an irradiation surface; and
an adjustment portion for adjusting an angle of the irradiation surface;
the adjustment portion is adjustable from a hole portion provided in the transportation apparatus; and
the hole portion is offset with respect to the adjustment portion and the irradiation surface.

Effects

According to the aspect of the invention, since the hole portion for adjustment which is provided in the transportation apparatus and the adjustment portion and the irradiation surface of the external detection device provided in the transportation apparatus are disposed so as to be offset, a possibility that an operator hinders irradiation is reduced when the angle of the irradiation surface of the external detection device is adjusted. As a result, it is possible to easily perform the adjustment and confirmation of the angle of the irradiation surface.

DESCRIPTION OF EMBODIMENTS

Figure 1:
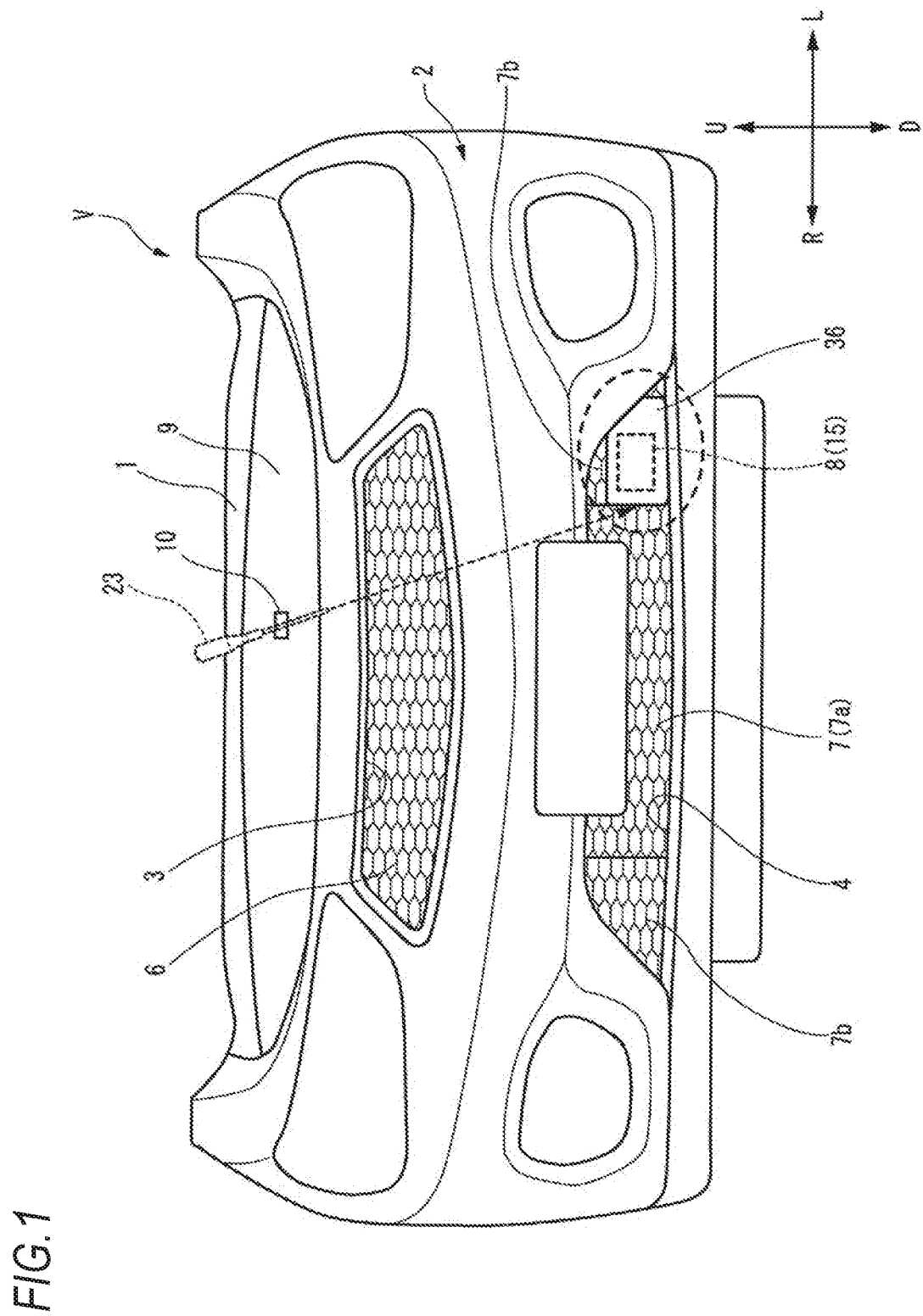
FIG. 1 is a front view of a front portion (open state of bonnet) of a vehicle according to an embodiment of the invention.

Hereinafter, an embodiment of the invention will be described with reference to FIGS. 1 to 10. The drawings are to be viewed in directions of reference letters and, in the following description, front and rear, left and right, and up and down follow the directions viewed from a driver. In the drawings, a front side of the vehicle is indicated by Fr, a rear side is indicated by Rr, a left side is indicated by L, a right side is indicated by R, an upper side is indicated by U, and a lower side is indicated by D.

Figure 2:
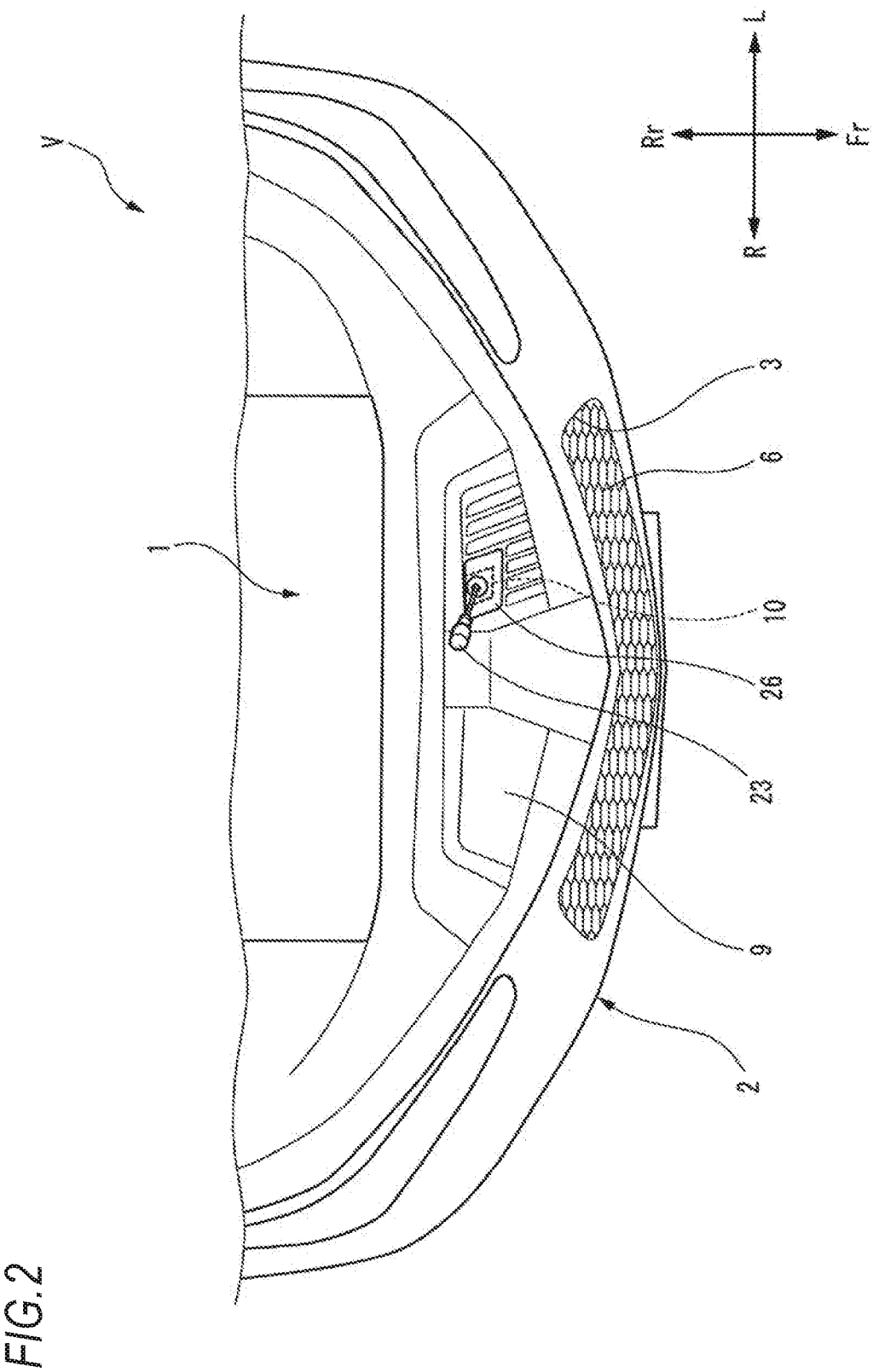
FIG. 2 is a plan view illustrating the front portion (open state of bonnet) of the vehicle.

As illustrated in FIGS. 1 and 2, a vehicle V of the embodiment, which is a transportation apparatus, includes a prime mover room 1 which accommodates a prime mover such as an engine and an electric motor, a vehicle front portion 2 which covers a front side of the prime mover room 1, and a bonnet (not illustrated) which openably covers an upper side of the prime mover room 1.

The vehicle front portion 2 includes an upper opening 3 and a lower opening 4 for introducing cooling air into the prime mover room 1. An upper front grill 6 and a lower front grill 7 including a large number of air introduction holes 5 (see FIG. 7) are respectively attached to the upper opening 3 and the lower opening 4 and a radar device 8 to be described below is disposed at a rear position of the lower front grill 7.

An upper portion of the vehicle front portion 2 is covered with a grill cover 9. In the grill cover 9, a hole portion 10 through which the radar device 8 is adjusted mainly in a factory for manufacturing the vehicle V is formed. The hole portion 10 is located at a position at which the hole portion 10 is covered with the bonnet when the bonnet (not illustrated) is closed and is exposed when the bonnet is opened.

The radar device 8 is an external detection device which irradiates an electromagnetic wave in a forward direction, receives a reflected wave, and detects an object such as a vehicle, a pedestrian, and an obstacle existing in front of the vehicle V based on the reflected wave.

Figure 3:
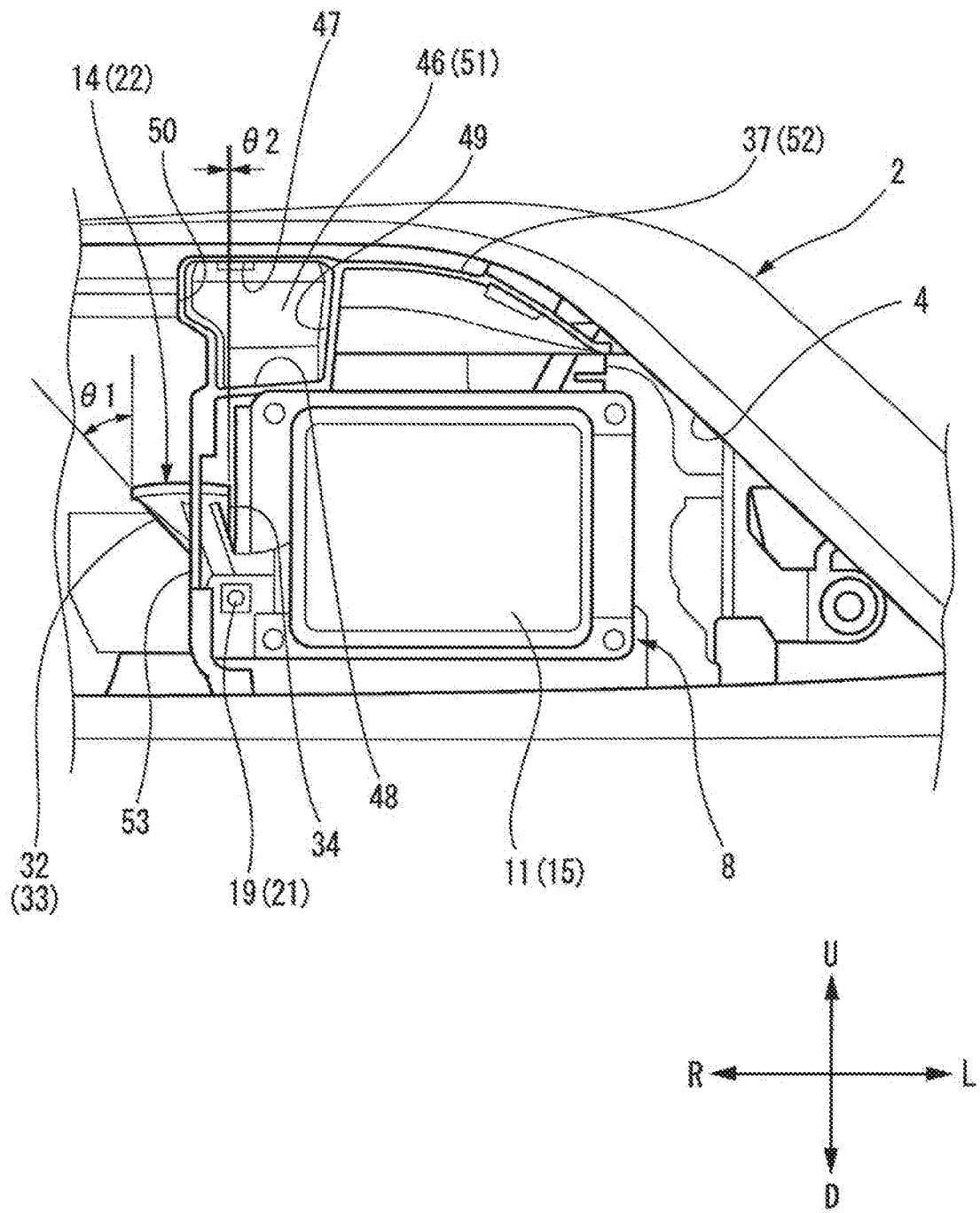
FIG. 3 is a front view of a radar device attachment portion (removal state of lower front grille) of the vehicle.
Figure 4:
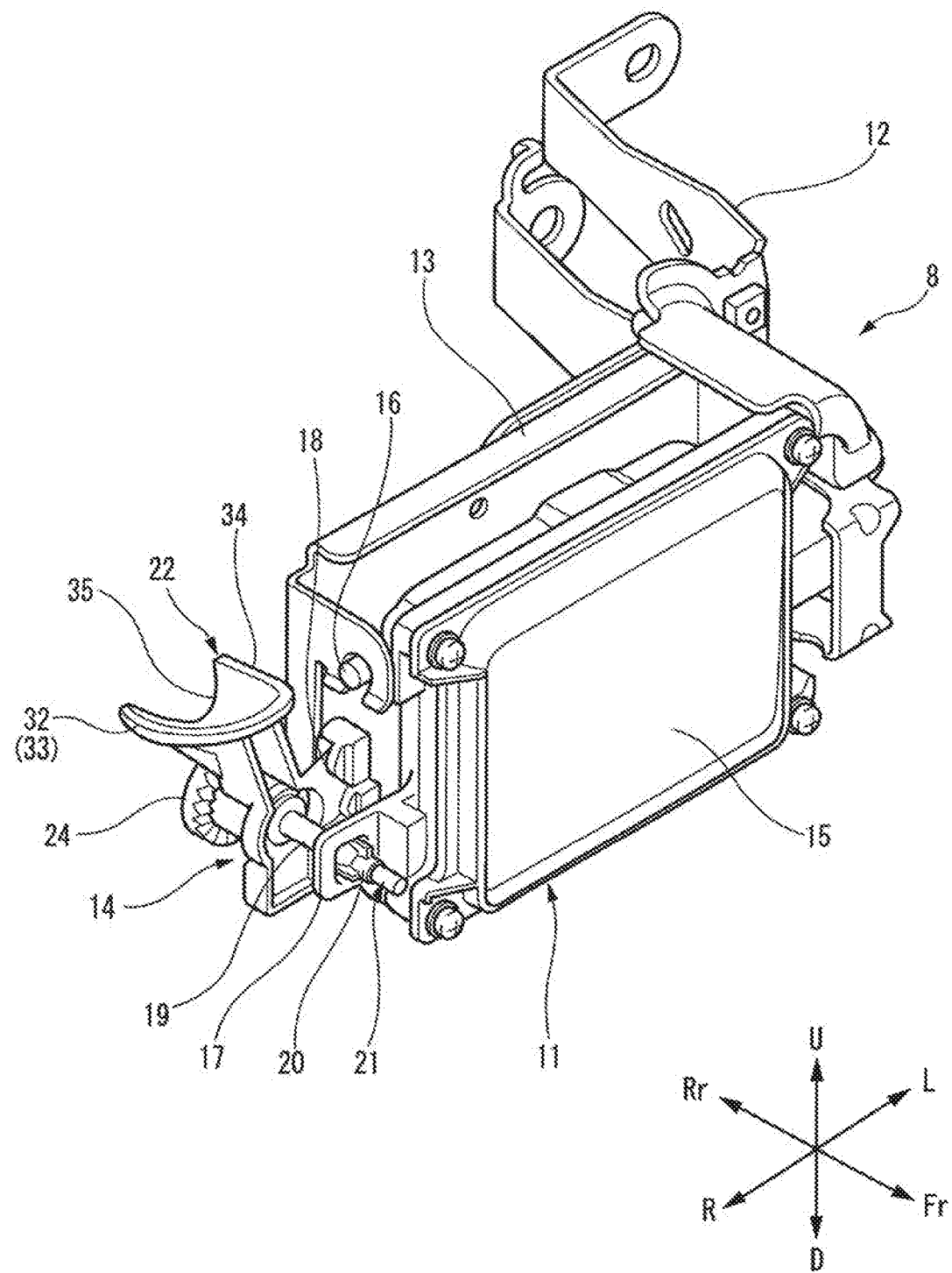
FIG. 4 is a perspective view of a radar device.

As illustrated in FIGS. 3 and 4, the radar device 8 of the embodiment includes a radar device main body 11, a bracket 13 which is fixed to the vehicle front portion 2 via a fixing member 12 and supports the radar device main body 11, and an adjustment portion 14 which is provided on one side (on a right side in the embodiment) of the radar device main body 11 and the bracket 13 and changes the angle of the radar device main body 11 according to an adjustment operation by an operator.

The radar device main body 11 includes an irradiation surface 15 which irradiates electromagnetic waves at the front surface of the radar device main body 11, a pivot support shaft 16 which protrudes from an upper end portion of the radar device main body 11 to both left and right sides and is pivotably supported by the bracket 13, and a connecting portion 17 which protrudes in one side (the right side in the embodiment) from a lower end portion of the radar device main body 11 and is connected to the bracket 13 via the adjustment portion 14.

Figure 5:
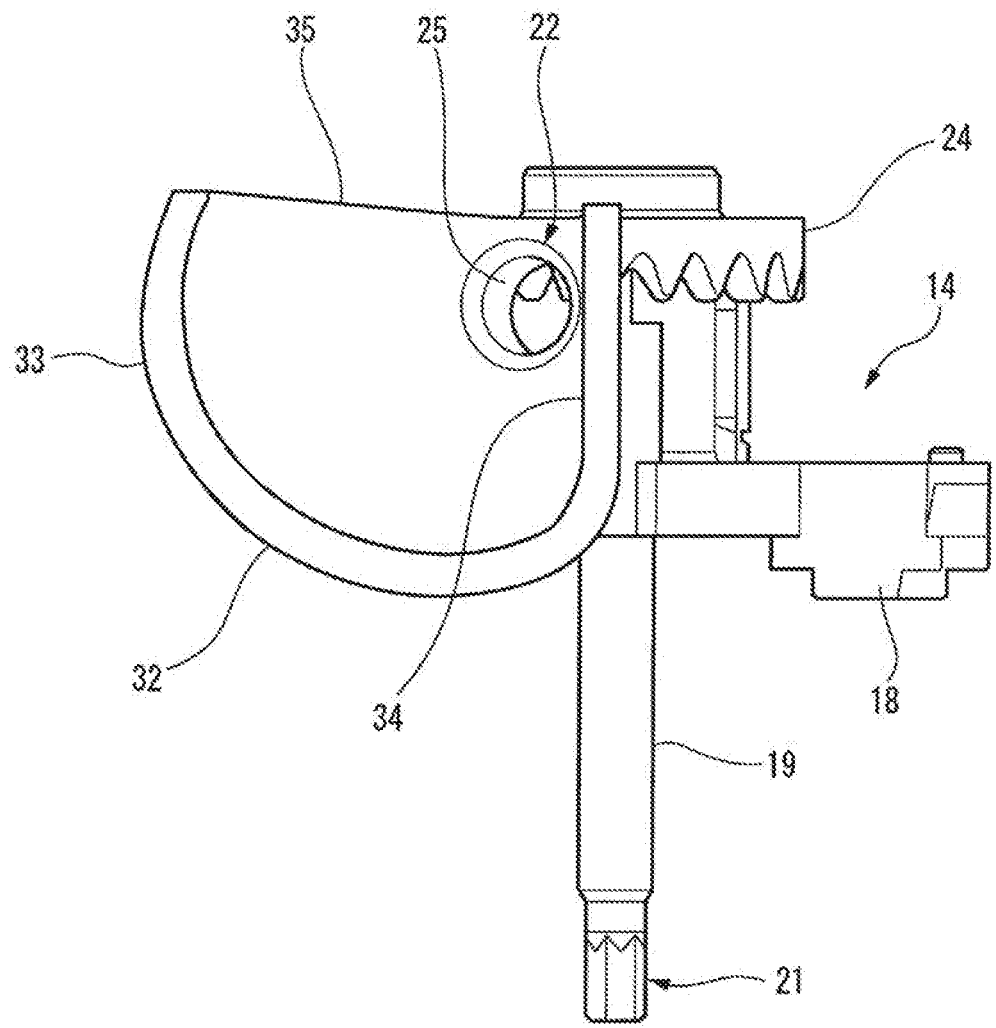
FIG. 5 is a plan view of an adjustment portion of the radar device.
Figure 5:
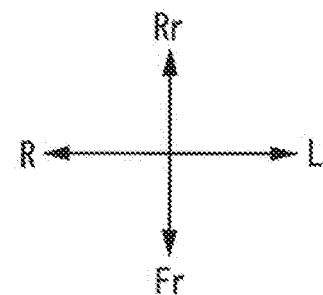

As illustrated in FIGS. 4 and 5, the adjustment portion 14 includes a fixed portion 18 which is fixed to the bracket 13, a bolt shaft 19 which passes through the fixed portion 18 in a front-rear direction and is supported by the fixed portion 18 so as to be rotatable in a direction around an axis and immovable in an axial direction, and a nut member 20 which is screwed to the bolt shaft 19 and fixed to the connecting portion 17 of the radar device main body 11 so as to be immovable in the direction around the axis and in the axial direction. According to such an adjustment portion 14, when the bolt shaft 19 is rotated, the nut member 20 moves forward and backward in a front and rear direction. Therefore, the radar device main body 11 pivots forward and backward with the pivot support shaft 16 as a fulcrum, and thus the vertical angle of the irradiation direction of the irradiation surface 15 is changed.

The adjustment portion 14 of the embodiment includes a first adjustment portion 21 which is a first adjustment operation position and a second adjustment portion 22 which is a second adjustment operation position. The first adjustment portion 21 is a non-circular portion formed at a front end portion of the bolt shaft 19, and when a predetermined adjustment tool (for example, a wrench) is fitted thereto, the rotation operation of the bolt shaft 19 becomes possible. It is assumed that, when the adjustment of the first adjustment portion 21 is carried out at a repair shop or the like, the adjustment operation is performed in a state where the lower front grill 7 or the like is removed and the front side of the radar device 8 is open.

It is assumed that the second adjustment portion 22 is to be adjusted by a long adjustment tool 23 (for example, a driver) inserted from the hole portion 10 of the grill cover 9 when the adjustment is performed at the factory for manufacturing the vehicle V. Specifically, the second adjustment portion 22 includes a gear 24 integrally rotatably provided at a rear end portion of the bolt shaft 19 and a guide hole 25 formed in the fixed portion 18. When a tip end portion of the adjustment tool 23 is inserted into the guide hole 25, the tip end portion of the adjustment tool 23 is rotatably supported in a state where the tip end portion is engaged with the gear 24. Therefore, a rotating operation of the bolt shaft 19 becomes possible by rotating the adjustment tool 23 in that state.

The hole portion 10 is disposed so as to be offset in a right-left direction regarding the adjustment portion 14 and the irradiation surface 15 of the radar device 8. For example, the hole portion 10 of the embodiment is offset to the right side regarding the adjustment portion 14 provided on the right side of the radar device 8. In this case, when the adjustment is carried out at the factory for manufacturing the vehicle V, if the adjustment operation of the adjustment portion 14 is performed by inserting the adjustment tool 23 from the hole portion 10 of the grill cover 9, a position where the worker stands is offset in the right-left direction regarding the irradiation surface 15 of the radar device 8. As a result, it becomes possible for an operator to easily adjust and confirm the angle of the irradiation surface 15 without hindering the irradiation. Since the hole portion 10 is formed in the grill cover 9 disposed further on an upper side than the radar device 8 in a vertical direction, the adjustment operation from above becomes possible. Therefore, the force for pressing the adjustment tool 23 is reduced.

Figure 6:
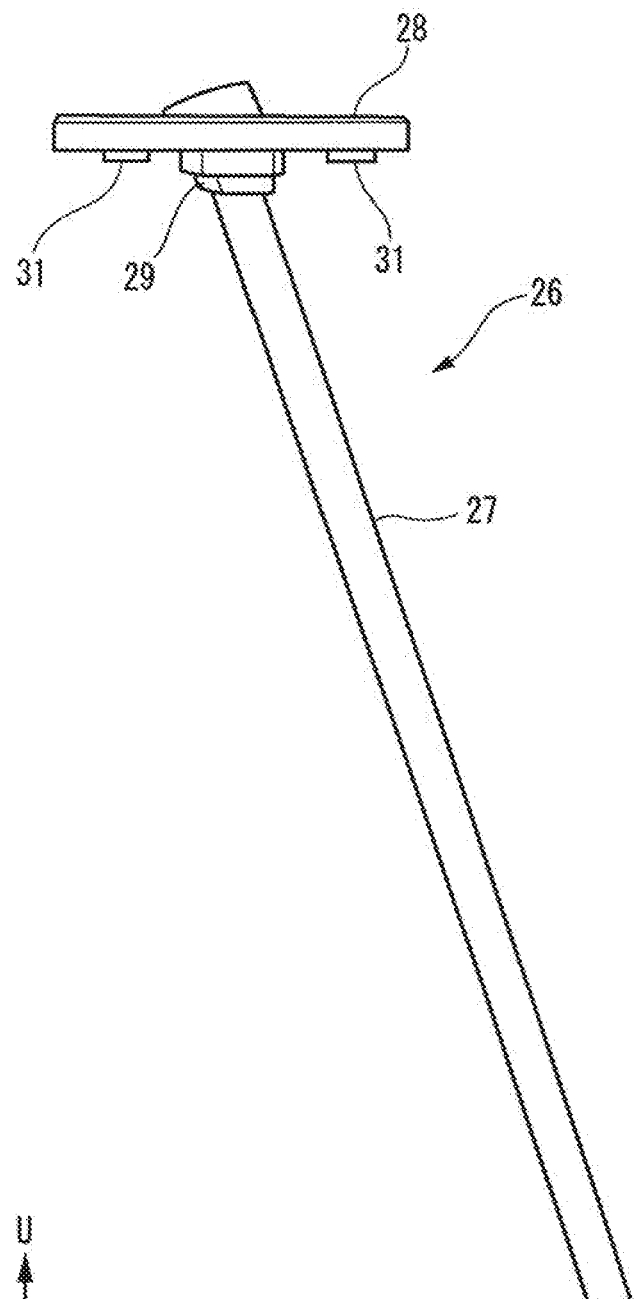
FIG. 6 is a from view of an adjustment jig.

In the embodiment, when the adjustment operation of the adjustment portion 14 is performed by inserting the adjustment tool 23 from the hole portion 10 of the grill cover 9, an adjustment jig 26 illustrated in FIG. 6 is used. The adjustment jig 26 includes a guide tube portion 27 which is inserted into the hole portion 10 of the grill cover 9 and guides the adjustment tool 23 inserted from an opening at an upper end portion to the guide hole 25 of the second adjustment portion 22, an abutment portion 28 which is provided at an upper end portion of the guide tube portion 27 and abuts on an upper surface of the grill cover 9, a first positioning protrusion portion 29 which protrudes from a lower surface of the abutment portion 28 and is fitted to the hole portion 10 of the grill cover 9 to position the abutment position of the abutment portion 28, and a second positioning protrusion portion 31 which protrudes from the lower surface of the abutment portion 28 and fitted a recess portion formed on the upper surface of the grill cover 9 to position the abutment position of the abutment portion 28. According to such an adjustment jig 26, the tip end portion of the long adjustment tool 23 inserted from the hole portion 10 of the grill cover 9 can be easily inserted into the guide hole 25 of the second adjustment portion 22.

As illustrated in FIGS. 3 to 5, the second adjustment portion 22 of the embodiment includes an enlarged diameter portion 32 of a funnel shape which expands in diameter from the guide hole 25 toward the hole portion 10 and guides the tip end portion of the adjustment tool 23 to the guide hole 25. The enlarged diameter portion 32 is disposed offset from the radar device main body 11 in the right-left direction (in the right direction in the embodiment). Therefore, when a shock is applied from the outside to the radar device 8, it is possible to prevent the radar device main body 11 from being damaged by the enlarged diameter portion 32 interfering with the radar device main body 11.

As illustrated in FIG. 3, an angle θ1 of a wall portion 33 of the enlarged diameter portion 32 regarding the vertical direction, which is the wall portion on a distal side away from the radar device main body 11 in the right-left direction is set to be greater than an angle θ2 of a wall portion 34 of the enlarged diameter portion 32, regarding the vertical direction, which is the wall portion on a proximal side close to the radar device main body 11 in the right-left direction and the hole portion is disposed on the distal side in the right-left direction. According to such an enlarged diameter portion 32, when the adjustment of the radar device 8 is performed by inserting the adjustment tool 23 from the hole portion 10, access from the hole portion 10 to the guide hole 25 of the second adjustment portion 22 becomes easy. After the adjustment tool 23 enters the enlarged diameter portion 32, the wall portion 34 of the enlarged diameter portion 32 of which the angle is close to the vertical becomes a wall and that makes it difficult to access from the hole portion 10 to the radar device main body 11. As a result, damage of the radar device main body 11 can be prevented while facilitating the adjustment operation.

The hole portion 10 is disposed so as to be offset from the guide hole 25 of the second adjustment portion 22 in the front-rear direction (the rear direction in the embodiment) and the enlarged diameter portion 32 includes a notch portion 35 cut out in parallel to the irradiation surface 15 on the hole portion 10 side (the rear side in the embodiment) in the front-rear direction. The notch portion 35 is formed such that the vertical height of the wall portions 33 and 34 of the enlarged diameter portion 32 becomes reduced in a vicinity of the guide hole 25 and the notch portion 35 is disposed in a portion between the hole portion 10 and the guide hole 25 of the second adjustment portion 22 in the vertical direction. According to such an enlarged diameter portion 32, when the adjustment of the radar device 8 is performed by inserting the adjustment tool 23 from the hole portion 10, it is easy to access the guide hole 25 of the second adjustment portion 22 from the hole portion 10 due to the notch portion 35 in the enlarged diameter portion 32. The enlarged diameter portion 32 of the embodiment includes the notch portion 35 at the rear portion. Therefore, even when other constituent members (not illustrated) of the vehicle V are disposed behind the notch portion 35, it is possible to reduce the possibility that the enlarged diameter portion 32 damages other constituent members when a shock is applied to the enlarged diameter portion 32 from the outside.

Next, a lid member 36 and a cover member 37 for protecting the radar device 8 will be described with reference to FIGS. 1 and 7 to 10.

Figure 7:
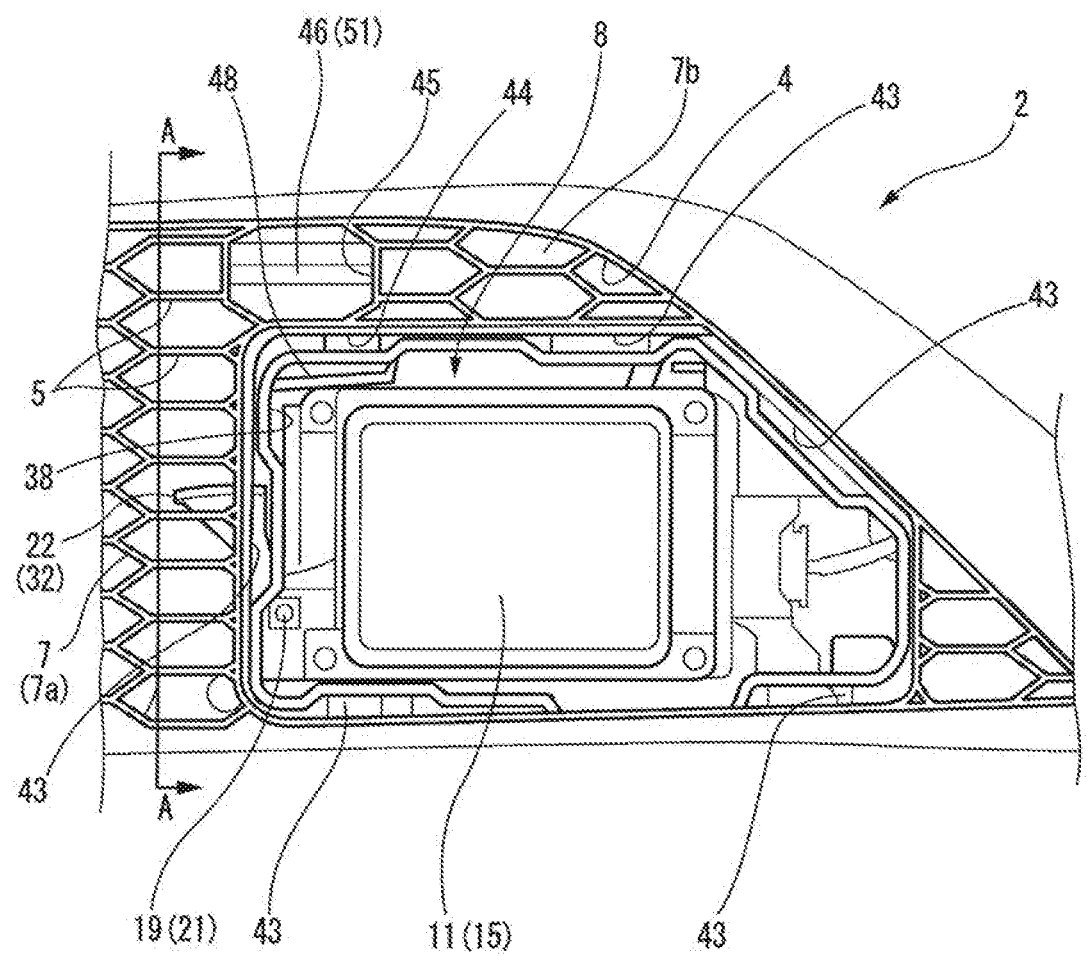
FIG. 7 is a front view of the radar device attachment portion (removal state of lid member) of the vehicle.
Figure 7:
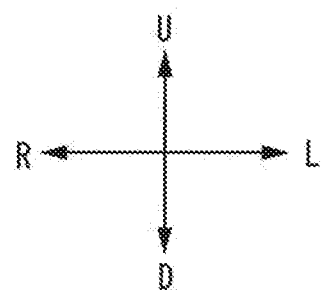
Figure 8:
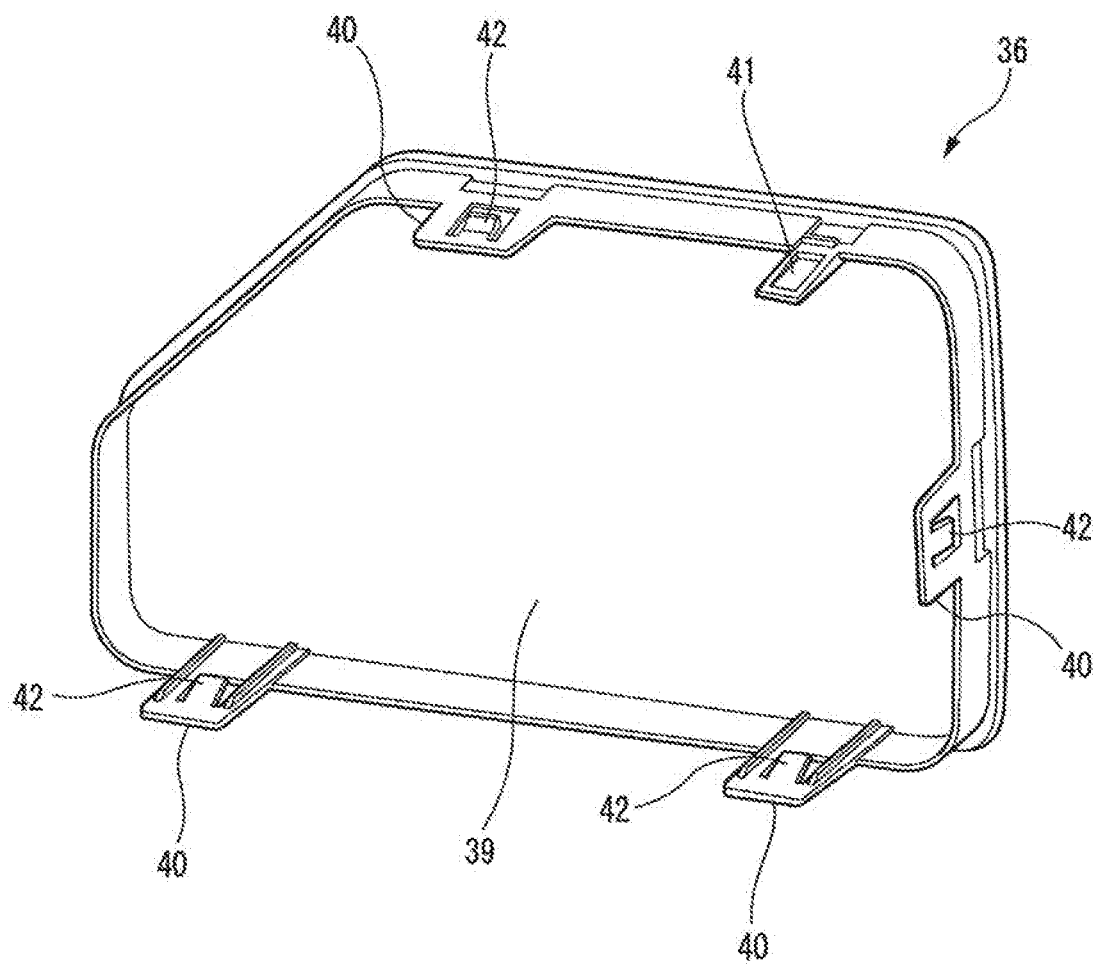
FIG. 8 is a perspective view of a lid member.
Figure 8:
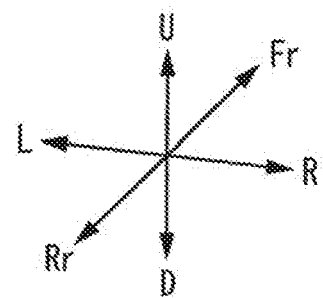

As illustrated in FIGS. 1 and 7 to 8, the lower front grill 7 disposed in front of the radar device 8 includes an air introduction portion 7a in which a large number of air introduction holes 5 communicate with the prime mover room 1 and an air blocking portion 7b in which the air introduction holes 5 are not communicated with the prime mover room 1. The air blocking portions 7b are provided on the left and right sides of the air introduction portion 7a and the radar device 8 is disposed behind the air blocking portion 7b on either (the left side in the embodiment) the left side or the right side. The air blocking portion 7b of the lower front grill 7 disposed in front of the radar device 8 is provided with an opening portion 38 for opening the front of the radar device 8 (irradiation surface 15) and a removable lid member 36 covering the front of the radar device 8 is attached to the opening portion 38.

In this case, the front side of the radar device 8 is open by removing only the lid member 36 from the lower front grill 7 without removing the lower front grill 7 from the vehicle V so the maintainability of the radar device 8 can be improved. Since the first adjustment portion 21 described above is exposed by removing the lid member 36, the angle adjustment of the irradiation surface 15 can be easily performed even at a maintenance shop or the like.

As illustrated in FIG. 8, the lid member 36 includes a lid body 39 which covering the front of radar device 8, a plurality of engaging protrusion portions 40 and 41 which protrude rearward from a peripheral edge portion of the lid body 39, and an engaging claw 42 which is formed in the engaging protrusion portion 40. The lower front grill 7 includes a plurality of engaging holes 43 and 44 on a peripheral edge portion of the opening portion 38. When the engaging protrusion portions 40 and 41 of the lid member 36 are inserted into the engaging holes 43 and 44 from the front side, the engaging claw 42 of the engaging protrusion portion 40 is engaged with the engaging hole 43 in a come-off-prevention manner. Therefore, the lid member 36 is attached to the lower front grill 7.

Removal of the lid member 36 is enabled by pushing the lid member 36 forward from the inside (rear side) and releasing the engagement between the engaging claw 42 and the engaging hole 43. An opening portion 45 disposed close to the engaging hole 44 is provided in the lower front grill 7 and the engaging protrusion portion 41 of the lid member 36 which is inserted into the engaging hole 44 is disposed so as to be able to be pushed forward from the inside of the lid member 36 by a finger or a tool put in the opening portion 45 from the front of the lower front grill 7. Specifically, an opening portion 45 is formed above a right end portion of the opening portion 38 in the lower front grill 7 and the engaging protrusion portion 41 provided at the upper right end portion of the lid member 36 can be pushed forward from the inside through the opening portion 45. According to such a lid member 36, removal is enabled by pushing the lid member 36 from the inside through the opening portion 45 of the lower front grill 7. Thus, it is easy to remove the lid member 36 as necessary while it is prevented from coming off due to shock when a flying object or water hit during travelling.

As illustrated in FIGS. 3, 7, 9, and 10, the cover member 37 is provided in the vehicle front portion 2 to cover an upper side and one lateral side (the right side in the present embodiment) of the radar device main body 11 (irradiation surface 15). The cover member 37 includes a space 46 which overlaps the opening portion 45 of the lower front grill 7 and the lid member 36 when viewed from the front. When the lid member 36 is removed, the lid member 36 is pushed from the inside through the opening portion 45 of the lower front grill 7 and the space 46 of the cover member 37.

As illustrated in FIG. 3, the cover member 37 includes a space upper wall portion 47 covering an upper side of the space 46, a space lower wall portion 48 covering a lower side of the space 46, a space left wall portion 49 covering a left side of the space 46, a space right side wall portion 50 covering a right side of the space 46, and a space rear wall portion 51 covering a rear side of the space 46. The space lower wall portion 48 is inclined such that the height of a distal side away from a center portion of the irradiation surface 15 of the radar device 8 in the right-left direction is set to be lower than that of a proximal side close to the center portion in the right-left direction and an end portion on the distal side is offset in the right-left direction (the right direction in the embodiment) regarding the irradiation surface 15 of the radar device 8. According to such a cover member 37, even when water enters from the opening portion 45 of the lower front grill 7 to the space 46, the space lower wall portion 48 guides the water to a position where it does not overlap the irradiation surface 15 and the water is discharged from the space 46. It is possible to prevent the water from adhering to the irradiation surface 15.

Figure 9:
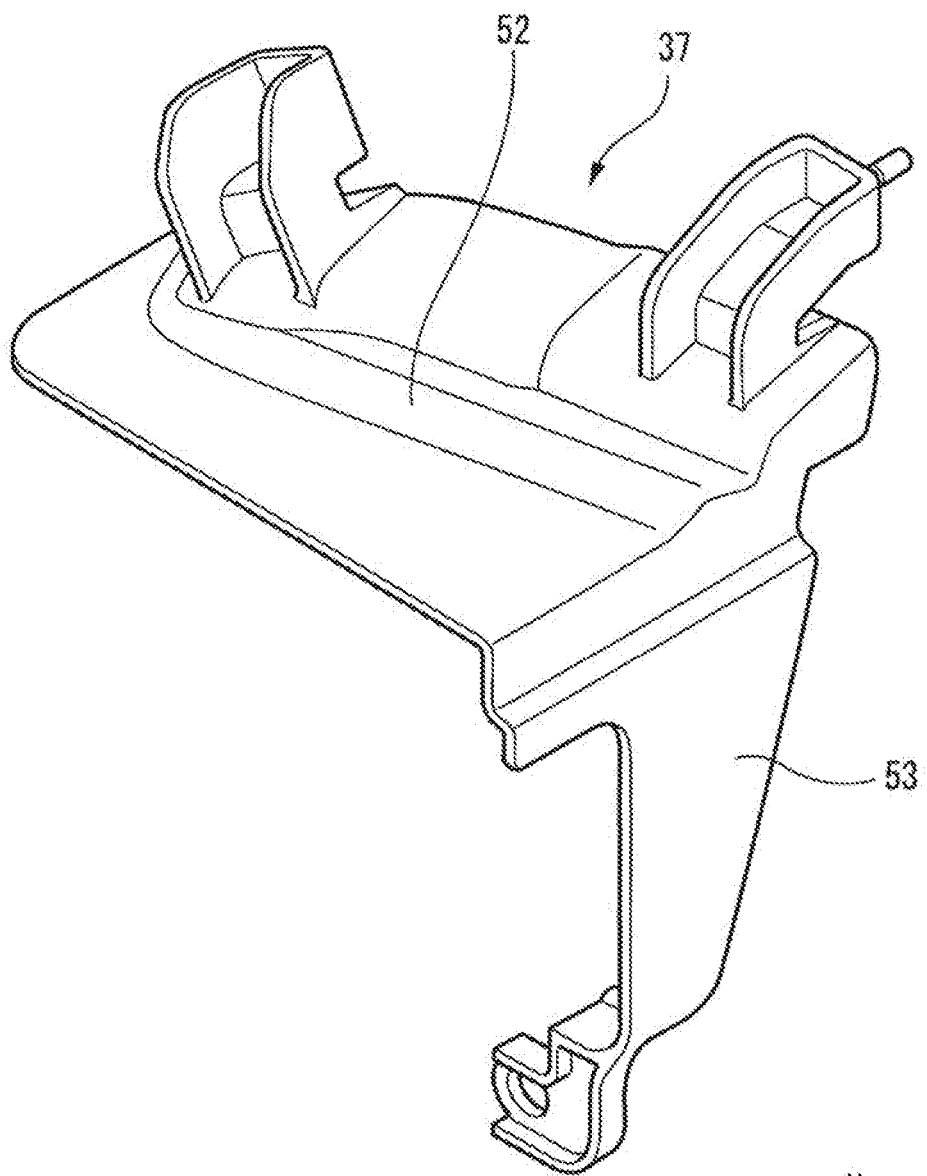
FIG. 9 is a perspective view of a cover member.
Figure 9:
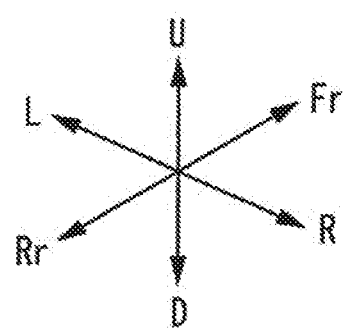
Figure 10:
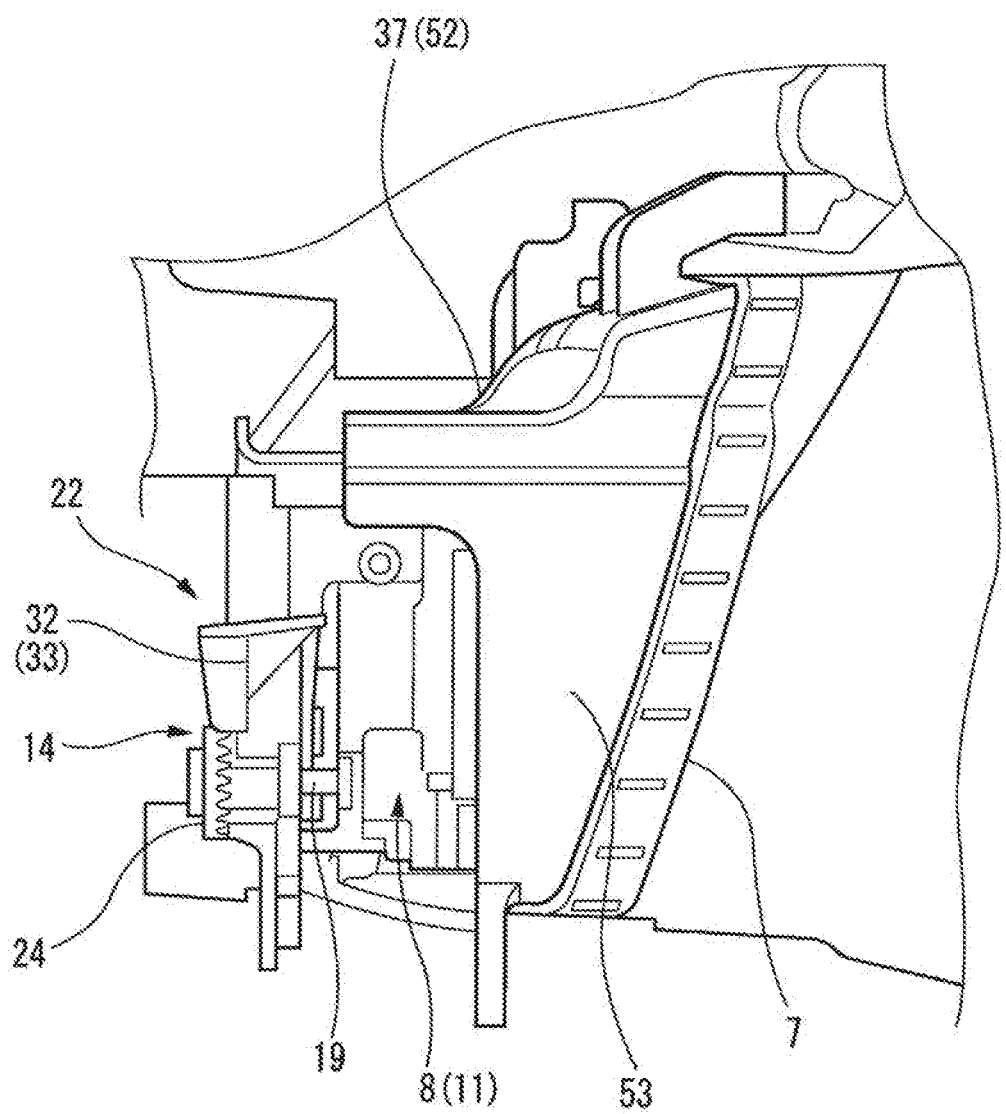
FIG. 10 is a cross-sectional view taken along the line A-A in FIG. 7.
Figure 10:
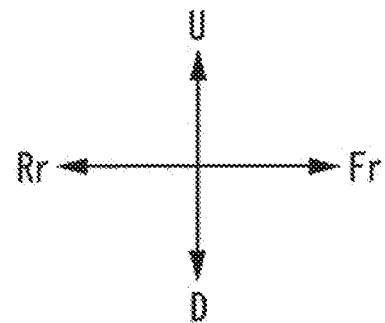

As illustrated in FIGS. 9 and 10, the cover member 37 includes an upper surface portion 52 covering an upper side of the radar device main body 11 and a side surface portion 53 covering one lateral side (the right side in the embodiment) of the radar device main body 11. The upper surface portion 52 of the cover member 37 overlaps the radar device main body 11 in the front-rear direction and is formed to be longer than the length of the radar device main body 11 in the front-rear direction, and further the rear side thereof is formed to be lower than the front side. According to such a cover member 37, even when water drips from above toward the radar device main body 11, the water flows from the front side to the rear side along the upper surface portion 52 of the cover member 37 along the travelling of the vehicle V. Therefore, it is possible to prevent the water from adhering to the irradiation surface 15 of the radar device main body 11.

The side surface portion 53 of the cover member 37 is formed so as to overlap the radar device main body 11 in the front-rear direction. According to such a cover member 37, even when water flew from the lateral side toward the radar device main body 11, the water flows to the rear side along the side surface portion 53 of the cover member 37 along the travelling of the vehicle V. Therefore, it is possible to prevent the water from adhering to the irradiation surface 15 of the radar device main body 11.

The embodiment described above can be appropriately modified, improved, and the like. In the embodiment described above, a radar device which irradiates an electromagnetic wave is exemplified as the external detection device. However, the external detection device is not limited to the radar device and it may be, for example a sonar device which irradiates an ultrasonic wave.

In the embodiment described above, in the transportation apparatus including the external detection device at the front portion, the hole portion is disposed so as to be offset in the right-left direction regarding the adjustment portion and the irradiation surface. However, the location is not limited thereto. For example, in the transportation apparatus including an external detection device at the rear portion, the hole portion may be disposed so as to be offset in the right-left direction regarding the adjustment portion and the irradiation surface.

When the external detection device is disposed at the lateral side of the transportation apparatus, the hole portion may be disposed so as to be offset in the front-rear direction regarding the adjustment portion and the irradiation surface. In this way, by disposing the external detection device on the lateral side of the transportation apparatus, it is possible to detect an object on the lateral side of the transportation apparatus. Since the hole portion is offset in the front-rear direction of the transportation apparatus regarding the adjustment portion and the irradiation surface, an operator can easily adjust the irradiation surface and confirm the angle without disturbing the irradiation when the external detection device is adjusted.

When the external detection device is disposed at the corner of the transportation apparatus, the hole portion may be disposed so as to be offset in the right-left direction or the front-rear direction regarding the adjustment portion and the irradiation surface. In this way, by disposing the external detection device at the corner of the transportation apparatus, it is possible to detect objects ahead (or behind) and lateral to the transportation apparatus. Since the hole portion is offset in the right-left direction or the front-rear direction of the transportation apparatus regarding the adjustment portion and the irradiation surface, an operator can easily adjust the irradiation surface and confirm the angle without disturbing the irradiation when the external detection device is adjusted.

In the embodiment described above, the bonnet is exemplified as the opening/closing member covering the hole portion. However, the opening/closing member is not limited to the bonnet and it may be a back door or other opening/closing member for maintenance.

In the embodiment described above, the lower front grill is exemplified as the outer surface of the transportation apparatus which covers the external detection device. However, the outer surface is not limited to the lower front grill and it may be another member constituting the outer surface of the transportation apparatus.

In the embodiment described above, the engaging hole for engaging the engaging claw is exemplified as the abutment portion of the lid member provided on the outer surface of the transportation apparatus. However, the abutment portion is not limited to the engaging hole as long as it can hold the lid member and may be a magnet or the like.

At least the following matters are described in the specification. Incidentally, although the corresponding constituent elements and the likes in the embodiment described above are described in parentheses, it is not limited thereto.

(1) A transportation apparatus (vehicle V) which includes an external detection device (radar device 8) for detecting an object, in which
the external detection device includes
an irradiation surface (irradiation surface 15), and
an adjustment portion (adjustment portion 14) for adjusting an angle of the irradiation surface,
the adjustment portion is adjustable from a hole portion (hole portion 10) provided in the transportation apparatus, and
the hole portion is offset with respect to the adjustment portion and the irradiation surface.

According to (1), since the hole portion for adjustment which is provided in the transportation apparatus and the irradiation surface of the external detection device provided in the transportation apparatus are disposed so as to be offset, an operator can easily adjust the irradiation surface and confirm the angle without hindering the irradiation when the external detection device is adjusted.

(2) The transportation apparatus according to (1), in which
the external detection device includes an enlarged diameter portion (enlarged diameter portion 32) which expands from the adjustment portion toward the hole portion,
the enlarged diameter portion is disposed so as to be offset with respect to the irradiation surface,
an angle of a wall portion (wall portion 33) of the enlarged diameter portion, which is the wall portion on a distal side away from the external detection device, with respect to a vertical direction is set to be greater than that of a wall portion (wall portion 34) of the enlarged diameter portion, which is the wall portion on a proximal side close to the external detection device, with respect to the vertical direction, and
the hole portion is disposed on the distal side.

According to (2), when the adjustment of the external detection device is performed from the hole portion for adjustment, the shape of the enlarged diameter portion is formed so that it is easy to access from the hole portion to the adjustment portion. After the adjustment tool enters the enlarged diameter portion, the wall portion of the enlarged diameter portion of which the angle is close to the vertical functions as a wall, and thus it is difficult to access from the hole portion to the external detection device. As a result, it is possible to prevent damage to the external detection device while adjustment man-hour is reduced.

Since the enlarged diameter portion is disposed so as to be offset from the external detection device, it is possible to prevent the enlarged diameter portion from interfering with the external detection device and damaging the external detection device when a shock is applied to the external detection device from the outside.

(3) The transportation apparatus according to (1) or (2), in which
the external detection device includes an enlarged diameter portion (enlarged diameter portion 32) which expands from the adjustment portion toward the hole portion,
the enlarged diameter portion includes a notch portion (notch portion 35) which is cut out in parallel with the irradiation surface on a hole portion side,
in the notch portion, a vertical height of the wall portion (wall portion 33, 34) of the enlarged diameter portion is low in a vicinity of the adjustment portion, and
the notch portion is disposed between the hole portion and the adjustment portion in the vertical direction.

According to (3), when the adjustment of the external detection device is performed from the hole portion for adjustment, it is easy to access from the hole portion to the adjustment portion due to the notch portion provided in the enlarged diameter portion. After the adjustment tool enters the enlarged diameter portion, the wall portion of the enlarged diameter portion functions as a wall, and thus it is difficult to access from the hole portion to the adjustment portion. As a result, it is possible to prevent damage to the external detection device while adjustment man-hour is reduced.

(4) The transportation apparatus according to any one of (1) to (3), in which the external detection device includes an enlarged diameter portion (enlarged diameter portion 32) which expands from the adjustment portion toward the hole portion, the enlarged diameter portion includes a notch portion (notch portion 35) which is cut out in parallel with the irradiation surface, in the notch portion, a vertical height of the wall portion (wall portion 33, 34) of the enlarged diameter portion is low in a vicinity of the adjustment portion, and other constituent members are disposed in a vicinity of the notch portion.

According to (4), since the notch portion is disposed in the vicinity of the enlarged diameter portion, it is possible to prevent the enlarged diameter portion from damaging other constituent members of the transportation apparatus when a shock is applied to the enlarged diameter portion from the outside.

(5) The transportation apparatus according to any one of (1) to (4), in which the hole portion is disposed so as to be exposed when an opening/closing member (bonnet) of the transportation apparatus is in an open state.

According to (5), since the hole for adjustment is exposed in a state where the opening/closing member is opened, the external detection device can be prevented from shifting due to foreign matter entering erroneously during travelling of the transportation apparatus and the movement of the adjustment portion.

(6) The transportation apparatus according to any one of (1) to (5), in which the hole portion is disposed further on an upper side than the external detection device in the vertical direction of the transportation apparatus.

According to (6), since the hole portion is disposed further on an upper side than the external detection device in the vertical direction, the force for pressing the tool at the time of adjustment is reduced, and thus the adjustment man-hour can be reduced.

(7) The transportation apparatus according to any one of (1) to (6), in which the external detection device is disposed in a front portion (vehicle front portion 2) or a rear portion of the transportation apparatus, and the hole portion is offset in a right-left direction of the transportation apparatus with respect to the adjustment portion and the irradiation surface.

According to (7), since the external detection device is disposed in the front portion or the rear portion of the transportation apparatus, it is possible to detect the object in front of the transportation apparatus. Since the hole portion is offset in the right-left direction of the transportation apparatus with respect to the adjustment portion and the irradiation surface, an operator can easily adjust the irradiation surface and confirm the angle without disturbing the irradiation when the external detection device is adjusted.

(8) The transportation apparatus according to any one of (1) to (6), in which the external detection device is disposed in a side portion of the transportation apparatus, and the hole portion is offset in a front-rear direction of the transportation apparatus with respect to the adjustment portion and the irradiation surface.

According to (8), since the external detection device is disposed in the side portion of the transportation apparatus, it is possible to detect the object in the lateral side of the transportation apparatus. Since the hole portion is offset in the front-rear direction of the transportation apparatus with respect to the adjustment portion and the irradiation surface, an operator can easily adjust the irradiation surface and confirm the angle without disturbing the irradiation when the external detection device is adjusted.

(9) The transportation apparatus according to any one of (1) to (6), in which the external detection device is disposed at a corner of the transportation apparatus, and the hole portion is offset in the right-left direction or the front-rear direction of the transportation apparatus with respect to the adjustment portion and the irradiation surface.

According to (9), since the external detection device is disposed at the corner of the transportation apparatus, it is possible to detect the objects on the front side and the lateral side of the transportation apparatus. Since the hole portion is offset in the right-left direction or the front-rear direction of the transportation apparatus with respect to the adjustment portion and the irradiation surface, an operator can easily adjust the irradiation surface and confirm the angle without disturbing the irradiation when the external detection device is adjusted.

The invention claimed is:

1. A transportation apparatus comprising
an external detection device configured to detect an object, wherein:
the external detection device includes:
an irradiation surface; and
an adjustment portion for adjusting an angle of the irradiation surface;
the adjustment portion is adjustable from a hole portion provided in the transportation apparatus;
the hole portion is offset with respect to the adjustment portion and the irradiation surface;
the external detection device includes an enlarged diameter portion which expands from the adjustment portion toward the hole portion;
the enlarged diameter portion is disposed so as to be offset with respect to the irradiation surface;
an angle of a wall portion of the enlarged diameter portion, which is the wall portion on a distal side away from the external detection device, with respect to a vertical direction is set to be greater than that of a wall portion of the enlarged diameter portion, which is the wall portion on a proximal side close to the external detection device, with respect to the vertical direction; and
the hole portion is disposed on the distal side.

2. The transportation apparatus according to claim 1, wherein
the hole portion is disposed so as to be exposed when an opening/closing member of the transportation apparatus is in an open state.

3. The transportation apparatus according to claim 1, wherein
the hole portion is disposed further on an upper side than the external detection device in the vertical direction of the transportation apparatus.

4. The transportation apparatus according to claim 1, wherein:
the external detection device is disposed in a front portion or a rear portion of the transportation apparatus; and
the hole portion is offset in a right-left direction of the transportation apparatus with respect to the adjustment portion and the irradiation surface.

5. The transportation apparatus according to claim 1, wherein:
the external detection device is disposed in a side portion of the transportation apparatus; and
the hole portion is offset in a front-rear direction of the transportation apparatus with respect to the adjustment portion and the irradiation surface.

6. The transportation apparatus according to claim 1, wherein:
the external detection device is disposed at a corner of the transportation apparatus; and
the hole portion is offset in the right-left direction or the front-rear direction of the transportation apparatus with respect to the adjustment portion and the irradiation surface.

7. A transportation apparatus comprising
an external detection device configured to detect an object, wherein:
the external detection device includes:
an irradiation surface; and
an adjustment portion for adjusting an angle of the irradiation surface;
the adjustment portion is adjustable from a hole portion provided in the transportation apparatus;
the hole portion is offset with respect to the adjustment portion and the irradiation surface;
the external detection device includes an enlarged diameter portion which expands from the adjustment portion toward the hole portion;
the enlarged diameter portion includes a notch portion which is cut out in parallel with the irradiation surface on a hole portion side;
in the notch portion, a vertical height of the wall portion of the enlarged diameter portion is low in a vicinity of the adjustment portion; and
the notch portion is disposed between the hole portion and the adjustment portion in the vertical direction.

8. A transportation apparatus comprising
an external detection device configured to detect an object, wherein:
the external detection device includes:
an irradiation surface; and
an adjustment portion for adjusting an angle of the irradiation surface;
the adjustment portion is adjustable from a hole portion provided in the transportation apparatus;
the hole portion is offset with respect to the adjustment portion and the irradiation surface;
the external detection device includes an enlarged diameter portion which expands from the adjustment portion toward the hole portion;
the enlarged diameter portion includes a notch portion which is cut out in parallel with the irradiation surface;
in the notch portion, a vertical height of the wall portion of the enlarged diameter portion is low in a vicinity of the adjustment portion; and
other constituent members are disposed in a vicinity of the notch portion.

* * * * *